United States Patent
Uehara

(10) Patent No.: US 12,209,631 B2
(45) Date of Patent: Jan. 28, 2025

(54) DAMPER DEVICE

(71) Applicant: EXEDY Corporation, Neyagawa (JP)

(72) Inventor: Hiroshi Uehara, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 18/486,128

(22) Filed: Oct. 12, 2023

(65) Prior Publication Data

US 2024/0035524 A1    Feb. 1, 2024

Related U.S. Application Data

(63) Continuation of application No. 17/322,237, filed on May 17, 2021, now Pat. No. 11,815,148.

(30) Foreign Application Priority Data

Jun. 16, 2020    (JP) .................. 2020-103835

(51) Int. Cl.
    *F16D 7/02*          (2006.01)
    *F16D 3/12*          (2006.01)
    (Continued)

(52) U.S. Cl.
    CPC ............... *F16D 7/025* (2013.01); *F16D 3/12* (2013.01); *F16F 15/12353* (2013.01);
    (Continued)

(58) Field of Classification Search
    CPC ........ F16D 7/025; F16D 3/12; F16D 2300/22; F16F 15/12353; F16F 15/1292;
    (Continued)

(56) References Cited

U.S. PATENT DOCUMENTS

| 8,257,183 B2 | 9/2012 | Inoshita et al. |
| 8,696,474 B2 | 4/2014 | Saeki et al. |
| (Continued) | | |

FOREIGN PATENT DOCUMENTS

| JP | 2001173720 A | 6/2001 |
| JP | 2012077820 A | 4/2012 |
| (Continued) | | |

*Primary Examiner* — Greg Binda
(74) *Attorney, Agent, or Firm* — United IP Counselors, LLC

(57) ABSTRACT

A damper device includes a damper unit and a torque limiter unit. The damper unit includes first and second plates each including a plurality of window portions, a hub flange including a plurality of window holes, and a stopper mechanism. The first plate includes an engaging portion and a fixing portion fixed to the second plate. The engaging portion and the fixing portion are disposed radially outside the plurality of window portions. The hub flange includes a protrusion disposed circumferentially between and radially outside adjacent two of the plurality of window holes. The stopper mechanism is configured to be actuated by contact of the protrusion with the engaging portion. A fixation member, by which the first plate and the torque limiter unit are fixed, is disposed circumferentially between adjacent two of the plurality of window portions as seen in a direction along a rotational axis.

5 Claims, 4 Drawing Sheets

(51) Int. Cl.
  *F16F 15/123* (2006.01)
  *F16F 15/129* (2006.01)
  *F16F 15/131* (2006.01)

(52) U.S. Cl.
  CPC ...... *F16F 15/1292* (2013.01); *F16F 15/1297* (2013.01); *F16D 2300/22* (2013.01); *F16F 15/13185* (2013.01); *F16F 2222/04* (2013.01); *F16F 2232/02* (2013.01)

(58) Field of Classification Search
  CPC ............ F16F 15/1297; F16F 15/13185; F16F 2222/04; F16F 2232/02
  USPC .................................................. 464/46, 68.1
  See application file for complete search history.

(56) References Cited

U.S. PATENT DOCUMENTS 11,408,468 B2     8/2022   Uehara
11,815,148 B2 *  11/2023   Uehara .................... F16D 3/12

FOREIGN PATENT DOCUMENTS

| JP | 2014214818 A | 11/2014 |
| JP | 2015121256 A | 7/2015 |

* cited by examiner

DAMPER DEVICE

CROSS-REFERENCE TO RELATED APPLICATIONS

This application is a continuation of U.S. application Ser. No. 17/322,237 filed May 17, 2021 (now issued as U.S. Pat. No. 11,815,148 on Oct. 25, 2023), the priority benefit of which is claimed. It is based on and claims the priority benefit of Japanese Patent Application No. 2020-103835, filed Jun. 16, 2020, the entire contents of which are incorporated herein by reference.

TECHNICAL FIELD

The present invention relates to a damper device, particularly to a damper device provided between a power source-side member and an output-side member.

BACKGROUND ART

A type of hybrid vehicle including an engine and an electric motor, for instance, uses such a damper device as described in Japan Laid-open Patent Application Publication No. 2014-214818 in order to prevent transmission of an excessive torque from an output side to an engine side in engine start and so forth.

The damper device described in Japan Laid-open Patent Application Publication No. 2014-214818 is provided with a damper part, including a pair of plates and a plurality of torsion springs, and a torque limiter disposed on an outer peripheral side of the damper part. The damper part and the torque limiter are coupled by rivets. Besides, a plate composing part of the torque limiter is fixed to one of the pair of plates described above by the rivets.

Here, a torque, transmitted between the damper part and a flywheel, is limited by the torque limiter, whereby transmission of an excessive torque is prevented between the both.

In the damper device described in Japan Laid-open Patent Application Publication No. 2014-214818, the torque limiter is disposed on the outer peripheral side of the damper part. In more detail, the damper part includes, as an input-side rotor, a pair of first and second plates (the pair of plates) each having a disc shape, whereas the torque limiter includes a connecting plate (the plate) provided with friction members fixed to both lateral surfaces thereof. Besides, an inner peripheral part of the connecting plate is fixed to an outer peripheral part of the first plate by the rivets.

Such a well-known damper device as described above is increased in radial dimension when a torque limiter is disposed therein. This hinders compactness in size of the device.

BRIEF SUMMARY

It is an object of the present invention to realize compactness in size of a damper device having a torque limiter function by inhibiting increase in radial dimension of the damper device.

(1) A damper device according to the present invention is provided between a power source-side member and an output-side member. The damper device includes a damper unit and a torque limiter unit. The damper unit is coupled to the output-side member. The torque limiter unit limits a torque transmitted between the power source-side member and the damper unit. The damper unit includes first and second plates, a hub flange, a plurality of elastic members, and a stopper mechanism. The first and second plates are disposed in axial opposition to each other. The first and second plates each include a plurality of window portions disposed in circumferential alignment. The hub flange is rotatable relative to the first and second plates. The hub flange includes a flange. The flange is disposed axially between the first and second plates and includes a plurality of window holes disposed in corresponding positions to the plurality of window portions. The plurality of elastic members elastically couple the hub flange and the first and second plates in a rotational direction. The plurality of elastic members are accommodated in the plurality of window portions and the plurality of window holes. The stopper mechanism restricts relative rotation between the hub flange and the first and second plates to a range of a predetermined angle. The torque limiter unit includes an annular plate fixed at an inner peripheral part thereof to an outer peripheral part of the first plate by a fixation member. The first plate includes an engaging portion and a fixing portion. The engaging portion is disposed radially outside the plurality of window portions and extends toward the second plate. The fixing portion extends radially outward from a distal end of the engaging portion and is fixed to the second plate. The hub flange includes a protrusion disposed circumferentially between and radially outside adjacent two of the plurality of window holes. The stopper mechanism is configured to be actuated by contact of the protrusion with the engaging portion when the first and second plates are rotated relative to the hub flange at the predetermined angle. The fixation member is disposed circumferentially between adjacent two of the plurality of window portions as seen in a direction arranged along a rotational axis.

In the present damper device, a torque, transmitted between the damper unit and the power source-side member, is limited by the torque limiter unit. Therefore, when the present damper device is installed in a hybrid vehicle, for instance, an excessive torque can be prevented from being transmitted from the output side to the engine side in engine start or so forth.

The annular plate, composing part of the torque limiter unit, is herein fixed to the first plate of the damper unit by the fixation member at a position circumferentially between adjacent two of the plurality of window portions. In other words, the inner peripheral part of the torque limiter unit and the outer peripheral part of the damper unit are coupled to each other while overlapping each other as seen in the direction arranged along the rotational axis. Because of this, increase in radial dimension of the present damper device can be more inhibited than that of a well-known damper device.

(2) Preferably, the second plate and the flange each include an assembling hole enabling the fixation member to axially penetrate therethrough.

(3) Preferably, the torque limiter unit includes first and second sandwiching plates and an urging member. The first and second sandwiching plates are disposed to sandwich the annular plate therebetween. The first and second sandwiching plates are fixed to each other so as to be axially immovable. The urging member is disposed to be sandwiched together with the annular plate between the first and second sandwiching plates. The urging member urges a friction disc.

(4) Preferably, the first and second sandwiching plates overlap in part the fixing portion as seen in the direction arranged along the rotational axis.

Overall, according to the present invention described above, it is possible to achieve compactness in size of a damper device having a torque limiter function by inhibiting increase in radial dimension of the damper device.

DETAILED DESCRIPTION [ENTIRE CONFIGURATION]

Figure 1:
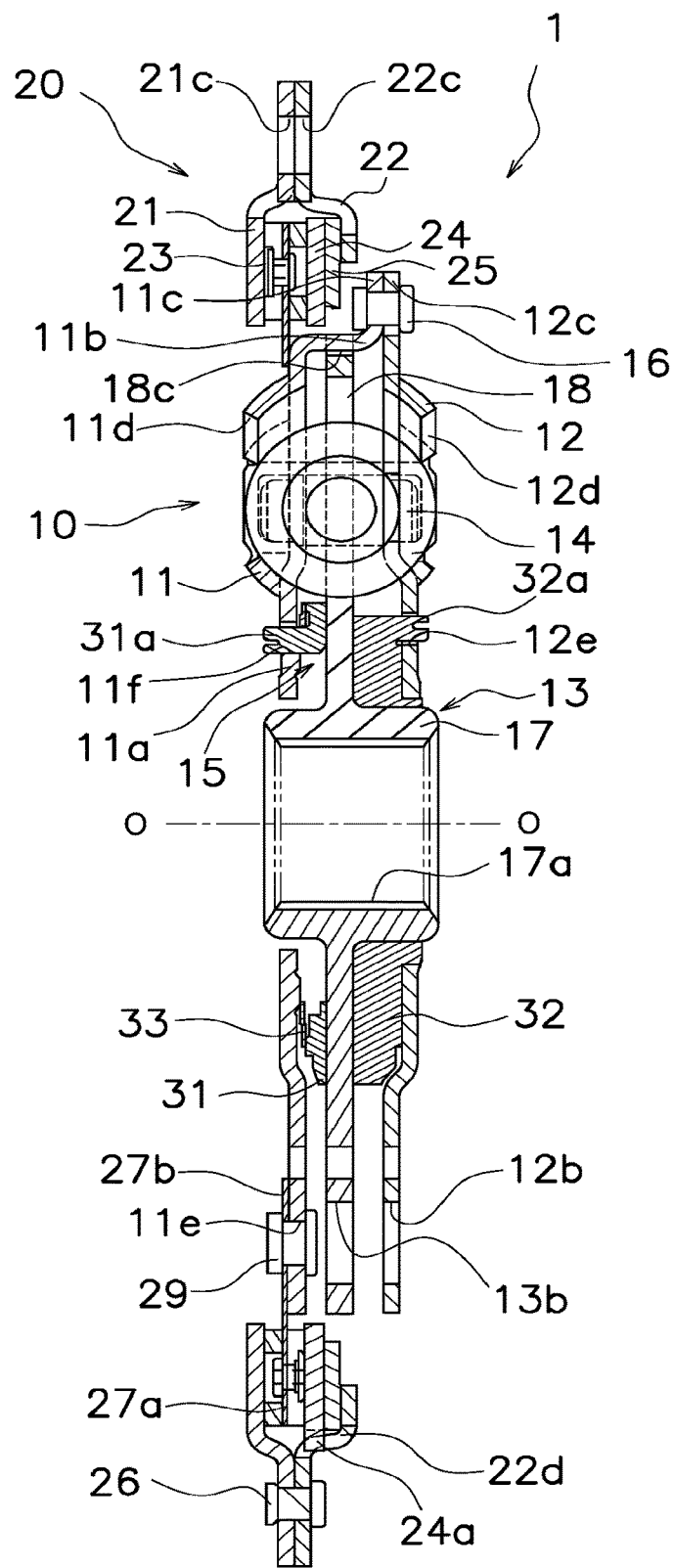
FIG. 1 is a section view of a damper device according to a preferred embodiment of the present invention, taken along the two-part, angled cut-line indicated in FIG. 2.
Figure 2:
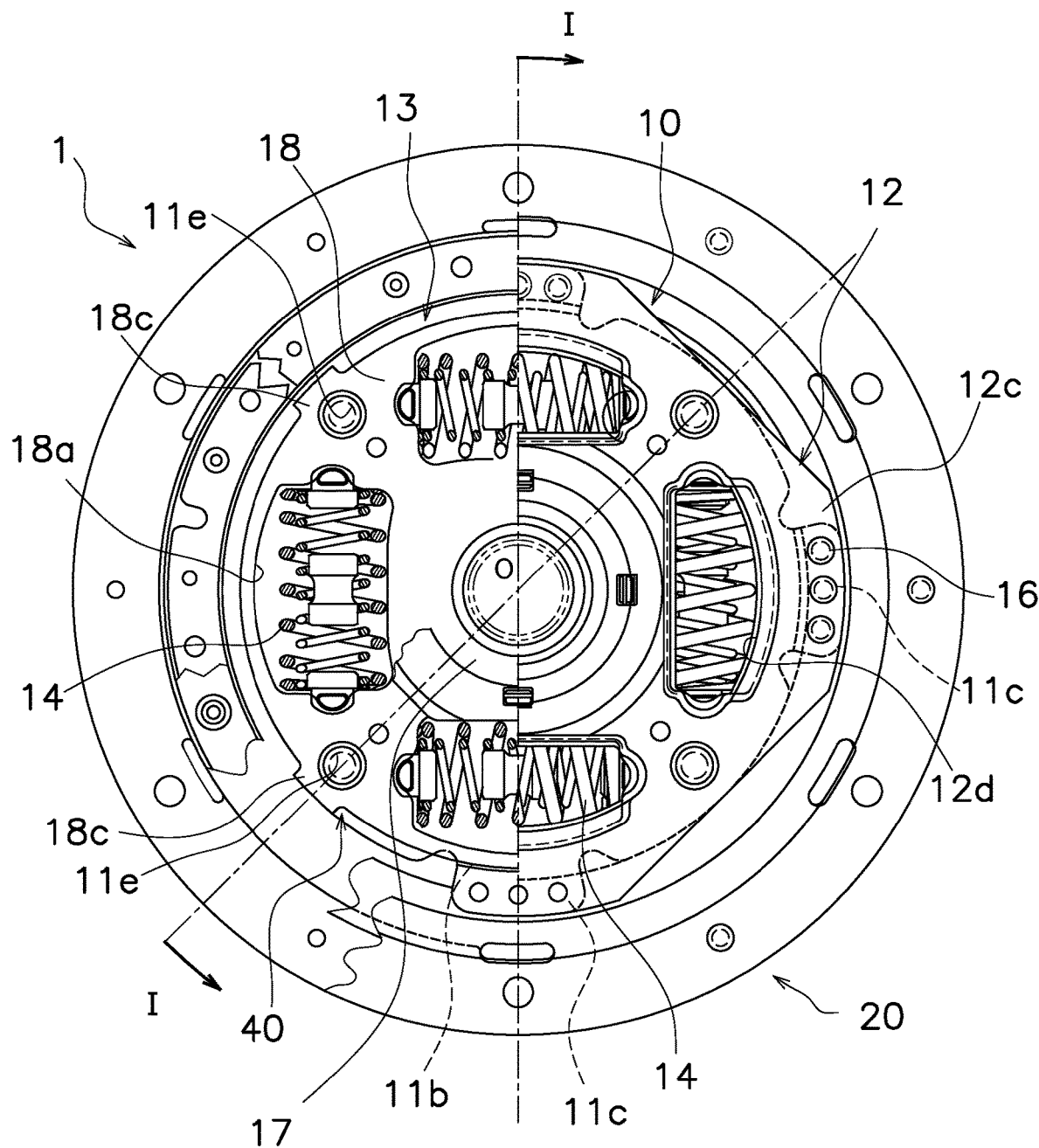
FIG. 2 is a front view of the damper device shown in FIG. 1.

FIG. 1 is a cross-sectional view of a damper device 1 according to a preferred embodiment of the present invention (hereinafter simply referred to as "damper device 1" on an as-needed basis). On the other hand, FIG. 2 is a front view of the damper device 1, from part of which some constituent members are detached. In FIG. 1, an engine is disposed on the left side of the damper device 1, whereas a drive unit, including an electric motor, a transmission, and so forth, is disposed on the right side of the damper device 1.

The damper device 1 is a device provided between a flywheel and an input shaft of the drive unit (both of which are not shown in the drawings) in order to limit a torque transmitted between the engine and the drive unit and attenuate rotational fluctuations. The damper device 1 includes a damper unit 10 and a torque limiter unit 20.

[Damper Unit 10]

As shown in FIG. 1, the damper unit 10 includes first and second plates 11 and 12, a hub flange 13, a plurality of torsion springs 14 (exemplary elastic members), a stopper mechanism 40, and a hysteresis generating mechanism 15.

<First Plate 11>

As described below, the first plate 11 is a member to which a constituent member of the torque limiter unit 20 is coupled. The first plate 11 includes a body 11a made in the shape of a disc, a plurality of engaging portions 11b, and a first fixing portion 11c. The body 11a is provided with a plurality of first window portions 11d in the outer peripheral part thereof. The first window portions 11d are disposed in circumferential alignment. Each first window portion 11d includes a hole and holding portions. The hole axially penetrates the first plate 11. The holding portions are provided on the outer and inner peripheral edges of the hole. The engaging portions 11b are formed by protruding portions of the outer peripheral end of the first plate 11 radially outward and then bending the protruded portions toward the second plate 12. The engaging portions 11b are further bent radially outward at the distal ends thereof; the bent distal ends are obtained as the first fixing portion 11c. Besides, the first plate 11 is provided with a plurality of rivet holes 11e in the outer peripheral part thereof in order to attach thereto the torque limiter unit 20.

<Second Plate 12>

The second plate 12 is disposed in axial opposition to the first plate 11 at an interval. The second plate 12 is made in the shape of a disc including straight portions in part of the outer peripheral surface thereof. Besides, the outermost diameter of the second plate 12 is equal to the outer diameter of the first plate 11. The second plate 12 is provided with a plurality of second window portions 12d in the outer peripheral part thereof. The second window portions 12d are provided in opposed positions to the first window portions 11d of the first plate 11. Each second window portion 12d includes a hole and holding portions. The hole axially penetrates the second plate 12. The holding portions are provided on the outer and inner peripheral edges of the hole. The second plate 12 is provided with a second fixing portion 12c in outer peripheral parts of circumferentially interposed regions between adjacent pairs of the second window portions 12d. Besides, the first fixing portion 11c of the first plate 11 and the second fixing portion 12c of the second plate 12 are fixed by rivets 16. Accordingly, the first plate 11 and the second plate 12 are immovable from each other in both axial and rotational directions.

Moreover, the second plate 12 is provided with a plurality of assembling work holes 12b in the outer peripheral part thereof. The assembling work holes 12b are disposed in corresponding positions to the rivet holes 11e of the first plate 11.

<Hub Flange 13>

The hub flange 13 includes a hub 17 and a flange 18. The hub 17, having a tubular shape, is provided in the center part of the hub flange 13. The flange 18 extends radially outward from the outer peripheral surface of the hub 17. The hub 17 is provided with a spline hole 17a on the inner peripheral surface thereof, whereby the input shaft of the drive unit is enabled to be spline-coupled to the spline hole 17a. The flange 18, having a disc shape, is disposed axially between the first plate 11 and the second plate 12. The flange 18 is provided with a plurality of window holes 18a. Each window hole 18a is provided in a corresponding position to each pair of the first window portion 11d of the first plate 11 and the second window portion 12d of the second plate 12.

The flange 18 is provided with a plurality of protrusions 18c on the outer peripheral surface thereof. The protrusions 18c protrude radially outward. Each protrusion 18c is disposed circumferentially between and radially outside adjacent two window holes 18a. Each protrusion 18c is capable of being contacted at one circumferential end surface thereof by one circumferential end surface of the engaging portion 11b adjacent thereto.

Besides, the hub flange 13 is provided with a plurality of assembling work holes 13b in the outer peripheral part thereof. The assembling work holes 13b are disposed in corresponding positions to the rivet holes 11e of the first plate 11.

<Torsion Springs 14>

The plural torsion springs 14 are accommodated in the window holes 18a of the hub flange 13, respectively, while being held in both axial and radial directions by the pairs of the first window portion 11d of the first plate 11 and the second window portion 12d of the second plate 12, respectively. Besides, both circumferential end surfaces of each torsion spring 14 are capable of making contact with the circumferential end surfaces of each triad of the first window portion 11d, the second window portion 12d, and the window hole 18a.

<Stopper Mechanism 40>

The stopper mechanism 40 restricts relative rotation between the hub flange 13 and the first and second plates 11 and 12 to a range of predetermined angle. The stopper mechanism 40 is composed of the engaging portions 11b of the first plate 11 and the protrusions 18c of the flange 18. When described in detail, the stopper mechanism 40 is configured such that each protrusion 18c of the hub flange 13 makes contact with one circumferential end surface of each engaging protrusion 11b when the first and second plates 11 and 12 are rotated at the predetermined angle with respect to the hub flange 13. Each protrusion 18c is herein disposed circumferentially between and radially outside adjacent two window holes 18a. Hence, the flange 18 is enhanced in strength compared to when each protrusion 18c is disposed radially outside each window hole 18a.

<Hysteresis Generating Mechanism 15>

The hysteresis generating mechanism 15 includes a first bushing 31, a second bushing 32, and a cone spring 33.

The first bushing 31 is disposed axially between the inner peripheral part of the first plate 11 and that of the flange 18 of the hub flange 13. The first bushing 31 is provided with a plurality of engaging protrusions 31a axially protruding. The engaging protrusions 31a are engaged with holes 11f provided in the first plate 11. Therefore, the first bushing 31 is non-rotatable relative to the first plate 11.

The second bushing 32 is disposed axially between the inner peripheral part of the second plate 12 and that of the flange 18 of the hub flange 13. The second bushing 32 is provided with a plurality of engaging protrusions 32a axially protruding. The engaging protrusions 32a are engaged with holes 12e provided in the second plate 12. Therefore, the second bushing 32 is non-rotatable relative to the second plate 12.

The cone spring 33 is disposed axially between the first plate 11 and the first bushing 31. The cone spring 33 presses the first bushing 31 against the flange 18, and simultaneously, presses the second bushing 32 against the flange 18 through the first plate 11 and the second plate 12 fixed to the first plate 11.

In the hysteresis generating mechanism 15 described above, when the hub flange 13 and the first and second plates 11 and 12 are rotated relative to each other, friction resistance (hysteresis torque) is generated between the first bushing 31 and the flange 18, while friction resistance is generated between the second bushing 32 and the flange 18.

[Torque Limiter Unit 20]

Figure 3:
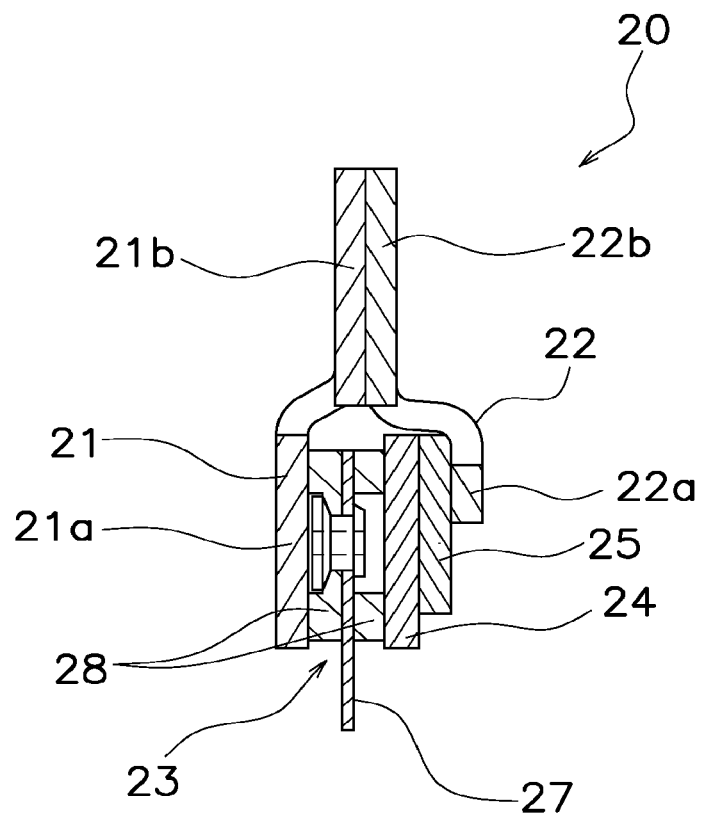
FIG. 3 is a view of a torque limiter unit extracted from the damper device shown in FIG. 1.

The torque limiter unit 20 is disposed on the outer peripheral side of the damper unit 10. The torque limiter unit 20 limits a torque transmitted between the flywheel and the damper unit 10. As shown in FIG. 3, the torque limiter unit 20 includes first and second sandwiching plates 21 and 22, a friction disc 23, a pressure plate 24, and a cone spring 25 (exemplary urging member). It should be noted that FIG. 3 shows the torque limiter unit 20-related components extracted from FIG. 1.

<First and Second Sandwiching Plates 21 and 22>

The first sandwiching plate 21 includes a friction portion 21a having an annular shape and a third fixing portion 21b. The third fixing portion 21b is formed by axially offsetting (displacing) the outer peripheral part of the friction portion 21a toward the second sandwiching plate 22. The second sandwiching plate 22 includes a support portion 22a having an annular shape and a fourth fixing portion 22b. The fourth fixing portion 22b is formed by axially offsetting (displacing) the outer peripheral part of the support portion 22a toward the first sandwiching plate 21. Besides, the third fixing portion 21b of the first sandwiching plate 21 and the fourth fixing portion 22b of the second sandwiching plate 22 are fixed to each other by a plurality of rivets 26 (see FIG. 1). The first and second sandwiching plates 21 and 22 overlap in part with the first fixing portion 11c as seen in a direction arranged along the rotational axis. The first and second sandwiching plates 21 and 22 are fixed to each other so as to be axially immovable.

It should be noted that in order to fix the torque limiter unit 20 to the flywheel, the third fixing portion 21b of the first sandwiching plate 21 is provided with a plurality of holes 21c (see FIG. 1), while the fourth fixing portion 22b of the second sandwiching plate 22 is provided with a plurality of holes 22c (see FIG. 1).

<Friction Disc 23>

Figure 4:
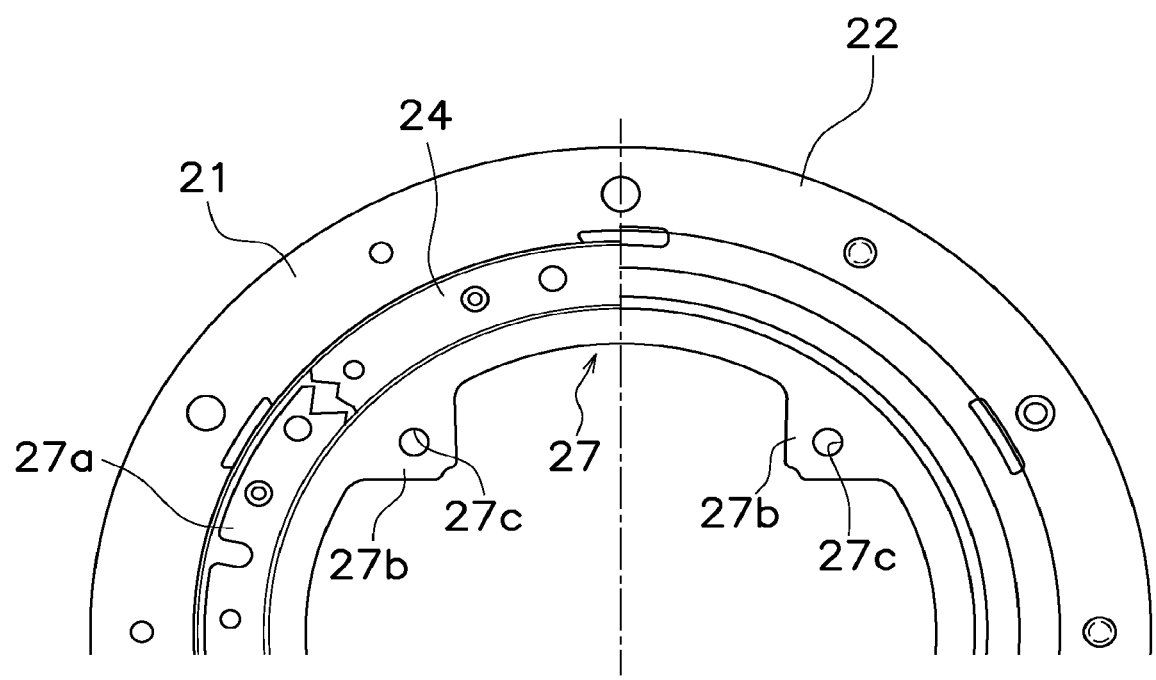
FIG. 4 is a partial front view of the torque limiter unit.

As shown in FIG. 3, the friction disc 23 includes an annular plate 27 and a pair of friction members 28 fixed to both lateral surfaces of the annular plate 27 by at least one rivet. As shown in FIGS. 3 and 4, the annular plate 27 includes a body 27a having an approximately annular shape and a plurality of fifth fixing portions 27b. FIG. 4 is a front view of part of the torque limiter unit 20. The fifth fixing portions 27b protrude radially inward from the inner peripheral end of the body 27a and are provided at equal angular intervals in the circumferential direction. Each fifth fixing portion 27b is provided with a coupling hole 27c. The annular plate 27 is fixed to the outer peripheral part of the first plate 11 by rivets 29 (exemplary fixation members; see FIG. 1) that penetrate the coupling holes 27c and the rivet holes 11e of the first plate 11. The flywheel-side one of the pair of friction members 28 makes contact with the friction portion 21a of the first sandwiching plate 21.

<Pressure Plate 24 and Cone Spring 25>

The pressure plate 24 and the cone spring 25 are disposed between the friction disc 23 and the support portion 22a of the second sandwiching plate 22.

The pressure plate 24, made in the shape of an annulus, interposes the friction members 28 of the friction disc 23 together with the friction portion 21a of the first sandwiching plate 21 therebetween. As shown in FIG. 1, the pressure plate 24 is provided with a plurality of pawls 24a in the outer peripheral part thereof, and the pawls 24a are engaged with a plurality of engaging holes 22d provided in the second sandwiching plate 22.

The cone spring 25 is disposed between the pressure plate 24 and the support portion 22a of the second sandwiching plate 22. The cone spring 25 presses the friction disc 23 against the friction portion 21a of the first sandwiching plate 21 through the pressure plate 24.

<Positional Relation Between Damper Unit 10 and Torque Limiter Unit 20>

As shown in FIGS. 1 and 2, the fifth fixing portions 27b of the friction disc 23 are located radially inside the first and second fixing portions 11c and 12c of the first and second plates 11 and 12. Besides, as seen in a front view, each fifth fixing portion 27b is disposed circumferentially between adjacent two of the first window portions 11d. Moreover, the fifth fixing portions 27b overlap in part with the first window portions 11d in terms of radial positions. Furthermore, the inner diameter of the torque limiter unit 20 (the inner diameter of the first sandwiching plate 21) is smaller than the outer diameter of the first and second plates 11 and 12 of the damper unit 10. In other words, the damper unit 10 and the torque limiter unit 20 radially overlap as seen in the direction arranged along the rotational axis. The rivets 29, by which the annular plate 27 is fixed to the outer peripheral part of the first plate 11, are each disposed circumferentially between adjacent two of the first/second window portions 11d, 12d as seen in the direction arranged along the rotational axis.

[Actions]

Power, transmitted from the engine to the flywheel, is inputted to the damper unit 10 through the torque limiter unit 20. In the damper unit 10, the power is inputted to the first and second plates 11 and 12, to which the friction disc 23 in the torque limiter unit 20 is fixed, and is then transmitted to the hub flange 13 through the torsion springs 14. Subsequently, the power is further transmitted from the hub flange 13 to the electric motor, the transmission, a power generator, and so forth disposed on the output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the torque limiter unit 20.

In the damper unit 10, when the power is transmitted to the torsion springs 14 from the first and second plates 11 and 12, the torsion springs 14 are compressed. Besides, the torsion springs 14 are repeatedly compressed and extended by torque fluctuations. When the torsion springs 14 are compressed and extended, torsion (displacement) is produced between the hub flange 13 and the first and second plates 11 and 12. The hysteresis generating mechanism 15 is actuated by this torsion and generates a hysteresis torque. Accordingly, torque fluctuations are attenuated.

When an angle of relative rotation between the hub flange 13 and the first and second plates 11 and 12 increases due to large torque fluctuations, the engaging portions 11b of the first plate 11 and circumferentially one-side end surfaces of the protrusions 18c of the flange 18 approach and make contact with each other. This prevents the relative rotation between the hub flange 13 and the first and second plates 11 and 12.

[Assemblage]

In the torque limiter unit 20, the friction disc 23, the pressure plate 24, and the cone spring 25 are sandwiched between the first and second sandwiching plates 21 and 22, whereby these members can be assembled as a sub-unit. Likewise, in another assembling step, the damper unit 10 can be also assembled in advance.

Then, in attaching the torque limiter unit 20 to the damper unit 10, the coupling holes 27c of the fifth fixing portions 27b in the friction disc 23 and the rivet holes 11e of the first plate 11 are aligned in position. Under the condition, rivet swaging is made by utilizing the assembling work holes 12b of the second plate 12. Accordingly, both units 10 and 20 can be fixed to each other.

Other Preferred Embodiments

The present invention is not limited to the preferred embodiment described above, and a variety of changes or modifications can be made without departing from the scope of the present invention.
(a) The specific configuration of the damper unit 10 and that of the torque limiter unit 20 are not limited to those in the preferred embodiment described above.
(b) The protrusions 18c may be each disposed circumferentially between adjacent two window holes 18a and along the circumference of the flange 18.

REFERENCE SIGNS LIST

1 Damper device
10 Damper unit
11 First plate
11b Engaging portion
11c First fixing portion
11d First window portion
12 Second plate
12c Second fixing portion
12b Assembling hole
12d Second window portion
13 Hub flange
14 Torsion spring (exemplary elastic member)
18 Flange
18a Window hole
21 First sandwiching plate
22 Second sandwiching plate
23 Friction disc
24 Pressure plate
25 Cone spring (exemplary urging member)
27b Fifth fixing portion
40 Stopper mechanism

What is claimed is:

1. A damper device configured to be provided between a power source-side member and an output-side member, the damper device comprising:
a damper unit configured to be coupled to the output-side member; and
a torque limiter unit configured to limit a torque that is transmitted between the power source-side member and the damper unit, the torque limiter unit including a friction disc,
wherein the damper unit comprises first and second plates that are axially spaced apart from and opposed to each other; a hub flange rotatable relative to the first and second plates; a plurality of elastic members elastically coupling the hub flange to the first and second plates in a rotational direction; and a stopper mechanism configured to limit relative rotation between the hub flange and the first and second plates to fall within a predetermined angular range,
wherein the first plate includes a plurality of window portions circumferentially aligned with each other and a plurality of engaging portions and fixing portions disposed circumferentially around a radially outer periphery of the first plate, the engaging portions extending toward the second plate and each of the fixing portions extending radially outwardly from a distal end of a respective one of the engaging portions with the first plate being attached to the second plate via the fixing portions,
wherein the engaging portions and the fixing portions are disposed radially outside the plurality of window portions of the first plate with the engaging portions and the fixing portions overlapping respective window portions of the first plate in the circumferential direction as seen in an axial direction of the damper unit,
wherein the second plate includes a plurality of window portions circumferentially aligned with each other, with each window portion in the second plate being aligned with a corresponding window portion in the first plate to form a plurality of window-portion pairs,
wherein the hub flange includes a flange disposed axially between the first plate and the second plate, with the flange including 1) a plurality of window holes disposed at positions corresponding to the locations of respective ones of the window-portion pairs and 2) a plurality of protrusions disposed circumferentially around a radially outer periphery of the flange, and with each of the protrusions being located circumferentially between and radially outside of a respective pair of circumferentially adjacent window holes,
wherein the stopper mechanism limits relative rotation between the hub flange and the first and second plates by virtue of the protrusions contacting the engaging portions when the first and second plates are rotated relative to the hub flange by an angular extent falling at a limit of the predetermined angular range, wherein the friction disc, and hence the torque limiter unit, is attached to the first plate via first fixation members that are located on a first-plate side of the flange in the axial direction, and the fixing portions of the first plate are joined to the second plate via second fixation members that are disposed on an opposite, second-plate side of the flange in the axial direction.

2. The damper device according to claim 1, wherein the friction disc including an annular plate and a pair of friction members disposed on opposite sides thereof, with each friction member being fixed to a respective lateral surface of the annular plate, and wherein the annular plate includes a body portion and a plurality of annular-plate fixing portions protruding radially inwardly from a radially inner peripheral edge of the body portion, each annular-plate fixing portion being provided with a coupling hole and one of said second fixation members inserted in the coupling hole to affix the annular plate to the first plate.

3. The damper device according to claim 2, wherein each of the second fixation members is disposed circumferentially between a respective pair of circumferentially adjacent window-portion pairs as seen in an axial direction of the damper device.

4. The damper device according to claim 2, wherein the torque limiter unit includes 1) first and second sandwiching plates disposed to sandwich the annular plate therebetween, with the first and second sandwiching plates being fixed to each other so as to be axially immovable with respect to each other, and 2) an urging member configured to urge the friction disc, the urging member disposed to be sandwiched together with the annular plate between the first and second sandwiching plates.

5. The damper device according to claim 4, wherein the first and second sandwiching plates overlap in part the fixing portion as seen in the axial direction of the damper device.

* * * * *